(12) United States Patent
Romero et al.

(10) Patent No.: US 9,043,109 B2
(45) Date of Patent: May 26, 2015

(54) METHOD FOR AUTOMATICALLY BRAKING A VEHICLE, AND CONTROL UNIT IN WHICH THE METHOD IS EXECUTED

(75) Inventors: Rafael Gonzalez Romero, Ilsfeld-Auenstein (DE); Otmar Bussmann, Abstatt (DE); Jose-Maria Rodelgo Lucas, Stuttgart (DE); Sabrina Dittrich, Murr (DE); Jens Schaetzle, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 83 days.

(21) Appl. No.: 13/880,312

(22) PCT Filed: Aug. 25, 2011

(86) PCT No.: PCT/EP2011/064608
§ 371 (c)(1),
(2), (4) Date: May 31, 2013

(87) PCT Pub. No.: WO2012/052206
PCT Pub. Date: Apr. 26, 2012

(65) Prior Publication Data
US 2013/0238207 A1    Sep. 12, 2013

(30) Foreign Application Priority Data
Oct. 18, 2010 (DE) .......................... 10 2010 042 589

(51) Int. Cl.
*B60T 7/12* (2006.01)
*B60T 8/32* (2006.01)
*B60T 8/36* (2006.01)
*B60T 8/40* (2006.01)
(Continued)

(52) U.S. Cl.
CPC ................. *B60T 7/12* (2013.01); *B60T 8/3275* (2013.01); *B60T 8/36* (2013.01); *B60T 8/4045* (2013.01); *B60T 8/442* (2013.01); *B60T 8/4872* (2013.01)

(58) Field of Classification Search
USPC .......................................................... 701/70
See application file for complete search history.

(56) References Cited

U.S. PATENT DOCUMENTS 3,078,676 A * 2/1963 Blair ............................. 188/351
4,509,802 A * 4/1985 Solleder et al. ............... 303/139
5,618,086 A * 4/1997 Reuter ....................... 303/119.2
(Continued)

FOREIGN PATENT DOCUMENTS

CN   1677837   10/2005
CN   1721246   1/2006
(Continued)

OTHER PUBLICATIONS

International Search Report, International Application No. PCT/EP2011/064608, dated Nov. 18, 2011.

*Primary Examiner* — Mary Cheung
*Assistant Examiner* — Michael Berns
(74) *Attorney, Agent, or Firm* — Kenyon & Kenyon LLP

(57) ABSTRACT

A method for automatically braking a vehicle using a hydraulic brake system, which includes a multi-stage valve situated between a master brake cylinder and the intake side of a hydraulic pump. To attenuate a pressure equalization process between a fluid volume on the side of the master brake cylinder and a suction line of the hydraulic pump, the control current for the valve is increased in ramp-shaped manner in order to first open a preliminary stage and then a main stage of the valve.

16 Claims, 4 Drawing Sheets

(51) Int. Cl.
*B60T 8/44* (2006.01)
*B60T 8/48* (2006.01)

(56) References Cited

U.S. PATENT DOCUMENTS

| | | | |
|---|---|---|---|
| 5,727,852 A | | 3/1998 | Pueschel et al. |
| 5,865,213 A | | 2/1999 | Scheffel et al. |
| 5,876,102 A | | 3/1999 | Mori et al. |
| 6,212,459 B1 * | | 4/2001 | Unterforsthuber ............. 701/70 |
| 6,560,088 B1 | | 5/2003 | Beck et al. |
| 7,992,947 B2 | | 8/2011 | Kaestner et al. |
| 2001/0038240 A1 * | | 11/2001 | Yoshida et al. ................ 303/28 |
| 2009/0072615 A1 * | | 3/2009 | Oosawa et al. ............ 303/113.1 |
| 2009/0189440 A1 * | | 7/2009 | Abe et al. .................. 303/114.1 |
| 2011/0178688 A1 * | | 7/2011 | Knechtges et al. ............. 701/70 |

FOREIGN PATENT DOCUMENTS

| | | |
|---|---|---|
| DE | 19525538 | 1/1996 |
| DE | 195 01 760 | 7/1996 |
| DE | 195 18 267 | 11/1996 |
| DE | 101 04 497 | 8/2002 |
| DE | 103 47 789 | 5/2005 |
| DE | 10 2004 029 838 | 12/2005 |
| EP | 1 014 395 | 6/2000 |
| WO | WO 97/06040 | 2/1997 |
| WO | WO 2005/051740 | 6/2005 |

* cited by examiner

METHOD FOR AUTOMATICALLY BRAKING A VEHICLE, AND CONTROL UNIT IN WHICH THE METHOD IS EXECUTED

FIELD

The present invention relates to a method for automatically braking a vehicle via a braking functionality.

BACKGROUND INFORMATION

Modern vehicles are usually equipped with an electronic stability program (ESP), which executes wheel-specific braking interventions in critical driving situations, such as when the vehicle oversteers or understeers.

In addition, conventional so-called comfort or also value-added functionalities assist the driver in a braking operation. Conventional added-value functionalities are, for example, a hydraulic brake assistant (HBA), which automatically generates brake pressure in collision-critical driving situations; an assistant in fading situations (HFC), which supports the driver when fading occurs; or an assistant for aiding the brake booster (HBB), which generates additional brake pressure in the event that the boost by the brake booster is insufficient.

To allow the implementation of such brake functionalities, the vehicles are equipped with a specially adapted brake system as it is shown in FIG. 1 by way of example. FIG. 1 shows a conventional hydraulic brake system 17, which has two brake circuits 19a, 19b in an X- or II-distribution featuring a symmetrical configuration. Below, reference is therefore made only to part 19a shown on the left side in the figure.

The brake system includes a foot brake pedal 1, a brake booster 2 having a master brake cylinder 4 connected thereto, on which a brake fluid reservoir 3 is situated. When foot brake pedal 1 is operated, corresponding pressure is built up in master brake lines 5a, 5b, this pressure acting on brakes 11 of the wheels via a switchover valve 8a and the two intake valves 10a, 10b. The path in which pressure builds up when foot brake pedal 1 is operated is indicated by arrows b. A high-pressure switching valve 7a is closed in this state (as illustrated).

In an intervention of an automatic brake functionality, the brake pressure is generated automatically, with the aid of a hydraulic pump 9a, 9b, which is actuated by a control unit (not shown). In the brake system illustrated, three pumps 9a, 9b are switched in parallel in each brake circuit. Switchover valve 8a is closed during the pressure regulation, and high-pressure switching valve 7a is usually open. Hydraulic pump 9a then conducts the hydraulic fluid to wheel brakes 11, along paths a. Thus, the hydraulic fluid flows out of brake fluid reservoir 3 through master brake line 5a, high-pressure switching valve 7a, a suction line 6a, through hydraulic pump 9a, and further through intake valves 10a, 10b, to wheel brakes 11. Brief peaks in the volume flow may be "buffered" in a compensation reservoir 14a, 14b.

Conventional brake functionalities do indeed improve the driving safety significantly, but they also entail a few disadvantages in terms of braking comfort. As soon as an automatic braking functionality, such as HFC or HBB, is triggered, high-pressure switching valve 7a switches from the closed state to the open state. However, in this situation the driver has already generated relatively high brake pressure in master brake lines 5a, 5b at brake pedal 1, whereas very low pressure prevails in suction line 6a on the other side of high-pressure switching valve 7a. If high-pressure switching valve 7a then switches to the open state, a so-called pressure equalization knock occurs, which manifests itself as a sudden loud noise to the driver. In addition, brake pedal 1 drops by a few centimeters, which likewise is unfamiliar to the driver.

SUMMARY

It is an object of the present invention to attenuate the pressure equalization process that takes place after high-pressure switching valve 7a is opened.

According to an example embodiment of the present invention, the control current for a multi-stage valve situated between the master brake cylinder and a hydraulic pump, e.g., the high-pressure switching valve, is increased in ramp-shaped manner, in order to initially open a preliminary stage, a main stage of the valve being opened only following a specific period of time. The opening of the preliminary stage begins to reduce the high pressure differential at the switching valve. If the main stage of the switching valve opens subsequently, the pressure equalization process is minimized considerably. The characteristic of the control current preferably is set up in such a way that the ramp for opening the preliminary stage, for example, lasts for a brief period of less than 200 ms, preferably 50 ms to 100 ms.

According to one preferred specific embodiment of the present invention, the control current is first set to a starting value in a stepwise manner, and then increased further in ramp-shaped manner, until a final value has been reached.

The starting value preferably is a value at which the preliminary stage of the valve opens, the starting value preferably being slightly smaller than the mentioned value, e.g., 0.9 A at an opening current value of 1 A. Since the valves usually have slight construction-related tolerances and thus feature slightly different current values for opening the preliminary stage, the starting value is preferably selected smaller than a minimally expected opening current value. As soon as a force equilibriums has then been reached at the valve, the main stage opens, which has the greater hydraulic cross-section, the opening of the main stage for the most part also being a function of the applied differential pressure.

The final value of the current ramp preferably is a value at which the preliminary stage is opened in reliable manner. The final value preferably is slightly larger than an opening current value maximally to be expected when taking the valve tolerances into account. It is preferred if the main stage opens only after reaching the final value, the opening instant being a function of the differential pressure.

The ramp preferably has a constant gradient.

The starting value and/or the final value and/or the steepness of the ramp of the current rise preferably are variable. According to one preferred specific embodiment, the value of said variables is a function of a brake pressure, especially the driver admission pressure acting at the master brake cylinder. This is so because the admission pressure has a closing effect on the valve, the basic premise being that the higher the admission pressure, the greater also the valve current required to open the preliminary stage or the main stage. At very high admission pressures, the starting value and the final value of the valve control current are therefore preferably adapted accordingly, in order to open the preliminary stage and the main stage in controlled manner. The admission pressure is measured with the aid of a pressure sensor.

To ensure that the main stage opens following the ramp actuation, the control current preferably is increased for a short period of time, to such an extent that the main stage must open automatically. The brief raising of the control current may take the form of a pulse or be repeated as required.

The afore-described ramp-shaped actuation of the valve preferably is used only in comfort-oriented braking operations, in which automatic assistance is to be rendered to the driver. In emergency situations, in which the vehicle should decelerate immediately, the valve preferably is opened directly so as to allow an immediate pressure buildup. In this case it is preferred if the control current is abruptly set to a high value at which the multi-stage valve opens directly, i.e., the preliminary stage and the main stage of the valve open virtually simultaneously. For instance, emergency braking situations may be detected based on the deceleration of the vehicle, or via the gradient of the master brake cylinder pressure input by the driver. The gradient threshold may be set to a value between 50 bar/s and 100 bar/s, for example. Other thresholds for detecting an emergency situation are basically freely definable.

Preferably, the duration of the current ramp of the valve current roughly amounts to between 100 ms and 200 ms. However, it may also be shorter or longer, depending on the braking situation.

According to one preferred specific development of the present invention, the hydraulic pump is activated at an instant at which the high-pressure switching valve has already opened completely (not before). This state occurs when the valve current has approximately reached the final value. In this way it is avoided that the hydraulic pump evacuates the suction line while the high-pressure switching valve is still closed, and the pressure equalization knock during the opening of the high-pressure switching valve becomes even greater.

However, one should distinguish between comfort-oriented braking operations and emergency situations also with regard to the startup instant of the hydraulic pump. In emergency situations, the most rapid generation of brake pressure is decisive. Therefore, the hydraulic pump preferably is activated as soon as an emergency situation is detected. In comfort-oriented braking operations, on the other hand, it is waited until the valve has opened completely.

Function tests to check the operability of the hydraulic pumps are performed at regular intervals, the hydraulic pumps being operated with closed high-pressure switching valves during these tests. This evacuates the suction lines of the hydraulic pumps, so that a more pronounced pressure equalization process takes place at the next normal braking operation involving automatic brake boosting. Thus, in a normal braking operation following the function test, the valve is briefly opened and then closed again at low brake pressure. Preferably, the valve is closed again as soon as the brake pressure in the course of the normal braking operation has increased to such an extent that it exceeds a predefined threshold value. The brief opening and closing of the valve causes the suction line to be charged with a small quantity of hydraulic fluid and the pressure in the suction line to rise accordingly. At the next normal braking operation featuring automatic brake boosting, the pressure equalization process will then be less pronounced.

The pressure threshold at which the high-pressure switching valve is closed again preferably lies at values of less than 5 bar, especially less than 2 bar. A higher threshold is not useful in general because the internal pump construction prevents higher pressures from being maintained.

According to one special development of the present invention, the high-pressure switching valve is opened already during the free travel of the brake pedal, even before pressure is built up in the brake circuit. As soon as the brake pressure exceeds the afore-described threshold, the valve is closed again.

Below, the present invention is explained in greater detail with reference to the figures and by way of example.

DETAILED DESCRIPTION OF EXAMPLE EMBODIMENTS

Figure 1:
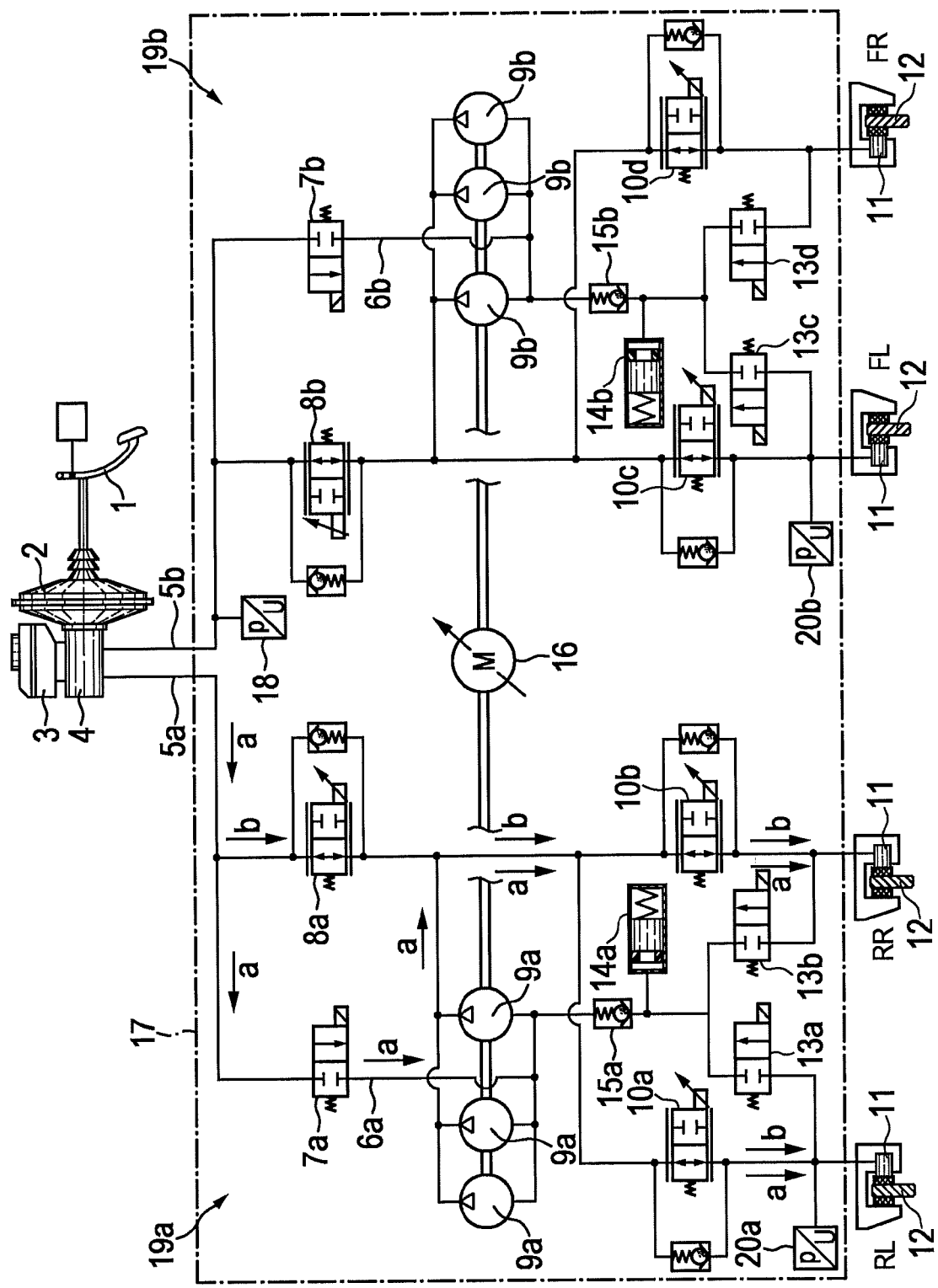
FIG. 1 shows a conventional hydraulic brake system, which is configured to implement an automatic brake functionality.

FIG. 1 shows different characteristic quantities of the brake system in a braking operation that follows a pump test run.

Reference is made to the introductory part of the specification regarding the explanation of FIG. 1.

Figure 2:
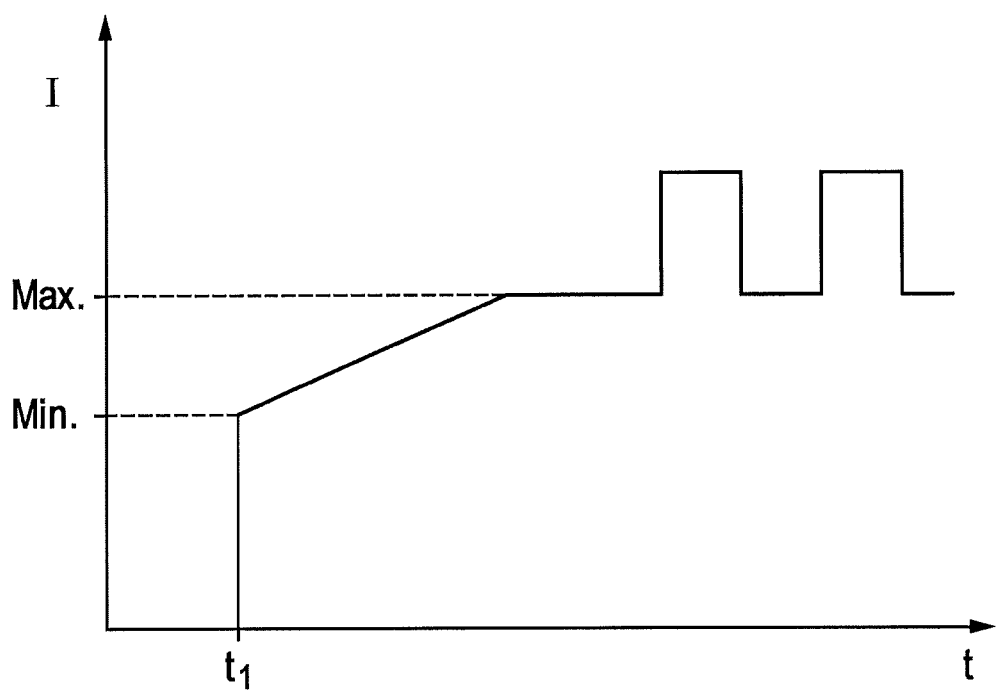
FIG. 2 shows the current characteristic of the control current of a high-pressure switching valve according to one specific embodiment of the present invention.

FIG. 2 illustrates the time characteristic of valve current I of a high-pressure switching valve 7a, 7b in a comfort-oriented braking operation featuring automatic brake boosting.

The driver first operates foot brake pedal 1 in order to build up brake pressure at wheel brakes 11. At instant $t_1$, an automatic brake assistant is activated since, for example, the boost provided by brake booster 2 is no longer sufficient to decelerate the vehicle in the desired manner (HBB hydraulic brake boost). In order to generate additional brake pressure, high-pressure switching valve 7a, 7b is opened. For this purpose valve current I is first set in stages to a starting value Min, which value lies close to the particular value at which the preliminary stage of valve 7a or 7b opens. Then, valve current I is increased in ramp-shaped manner, up to a final value Max. The preliminary stage opens during the current rise, so that the prechamber fills with hydraulic fluid. The main stage of valve 7a, 7a opens as well, but only a few milliseconds after the final value has been reached. Final value Max is selected in such a way that the preliminary stage of valve 7a, 7b is fully open in all cases. Once final value Max has been reached, the valve current stays at this level and is periodically increased in pulse-shaped manner in order to ensure that the main stage of valve 7a, 7b remains open.

The duration of the current ramp typically ranges from 100 ms to 200 ms. Depending on the braking situation, however, it may also be shorter or longer. The value of the quantities "starting value" (Min), "final value" (Max) and the ramp steepness preferably is a function of the driver admission pressure prevailing at master brake cylinder 4, since this admission pressure has a closing effect on valve 7a, 7b. The driver admission pressure is measured with the aid of a pressure sensor 18. The mentioned quantities preferably are adapted to the individually prevailing admission pressure. This makes it possible to open high-pressure switching valve 7a, 7b in a controlled manner in all instances.

Figure 3:
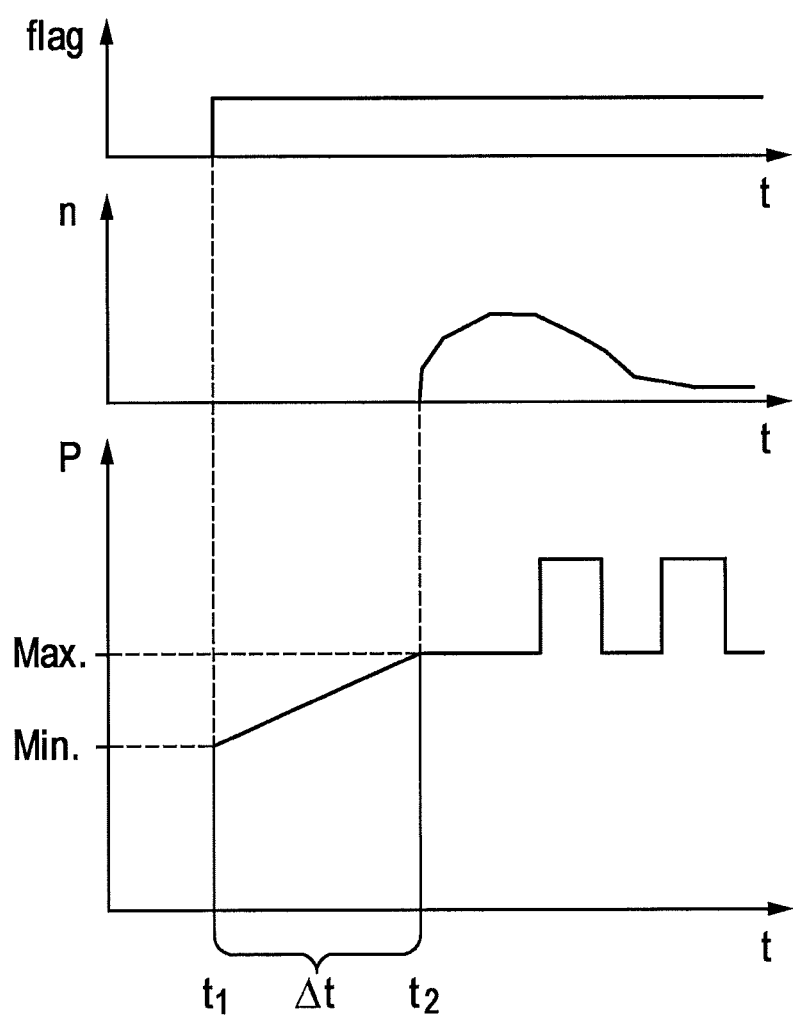
FIG. 3 shows a schematic flow chart for detecting a pump test run and for actuating the high-pressure switching valve.

FIG. 3 shows various characteristic quantities in a braking procedure featuring automatic brake boosting. Once again, the automatic brake boost becomes active at instant $t_1$. Here, this is indicated by a signal "flag". Valve current I is set to value Min and subsequently rises again in ramp-shaped manner until final value Max is reached. As soon as final value Max has been reached, hydraulic pump 9a or 9b is activated, as can be inferred from the rpm characteristic curve. The delay in the activation instant of hydraulic pump 9a, 9b is required because suction line 6a or 6b of hydraulic pump 9a, 9b would otherwise be evacuated as long as high-pressure switching valve 7a, 7b is not yet open. The starting instant of hydraulic pump 9a, 9b may also lie slightly before or after instant $t_2$.

Here, too, the delayed activation of hydraulic pumps 9a, 9b is used only for comfort-oriented braking operations. In the case of an emergency situation, hydraulic pumps 9a, 9b are activated directly after detecting the emergency situation, in order to allow the most rapid pressure buildup possible.

Figure 4:
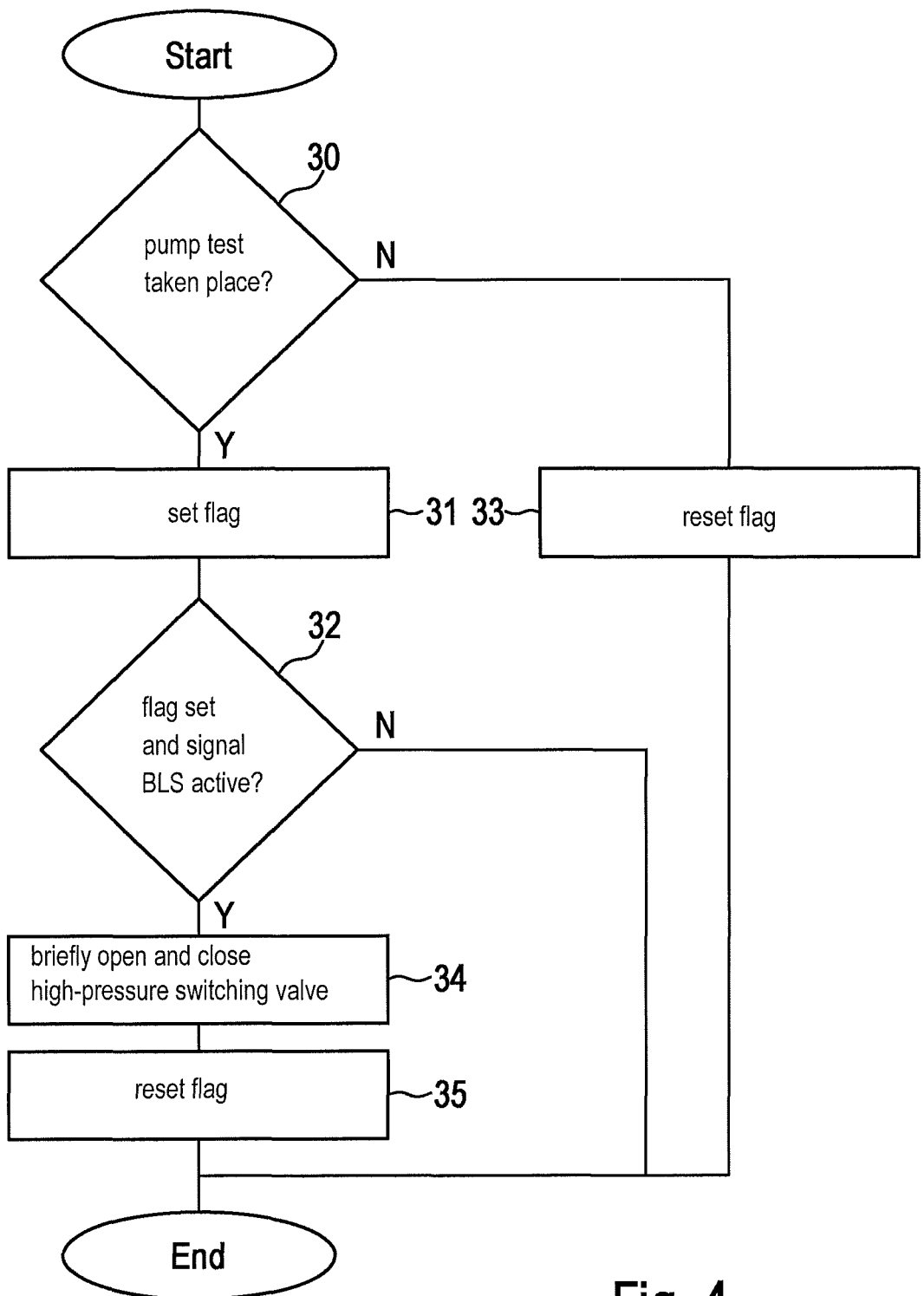
FIG. 4 shows a flow chart for detecting a pump test run and for actuating high-pressure switching valve.

FIG. 4 shows a flow chart for detecting a pump test run and for actuating high-pressure switching valve 7a, 7b following a test run. Hydraulic pumps 9a, 9b are generally checked for operativeness at regular intervals by means of a test run, during which they are taken into operation while high-pressure switching valves 7a, 7b are closed. This evacuates suction lines 6a, 6b, so that a subsequent pressure equalization process takes place in considerably more forceful manner. In order to avoid such a situation, it is first checked in step 30 whether such a pump test run is taking place or has taken place. If no test run has taken place (case N), a flag is reset in step 33 and the method ends. On the other hand, if a pump test run has taken place (case Y), a flag is set in step 31. In this case high-pressure switching valve 7a, 7b then is briefly opened and closed again at very low brake pressure in a subsequent braking operation, in order to charge evacuated suction lines 6a, 6b with hydraulic fluid and to thereby dampen the pressure equalization process.

The next normal braking operation may be detected by means of the brake light switch, for example. The signal of brake light switch BLS is illustrated on top in FIG. 5.

Figure 5:
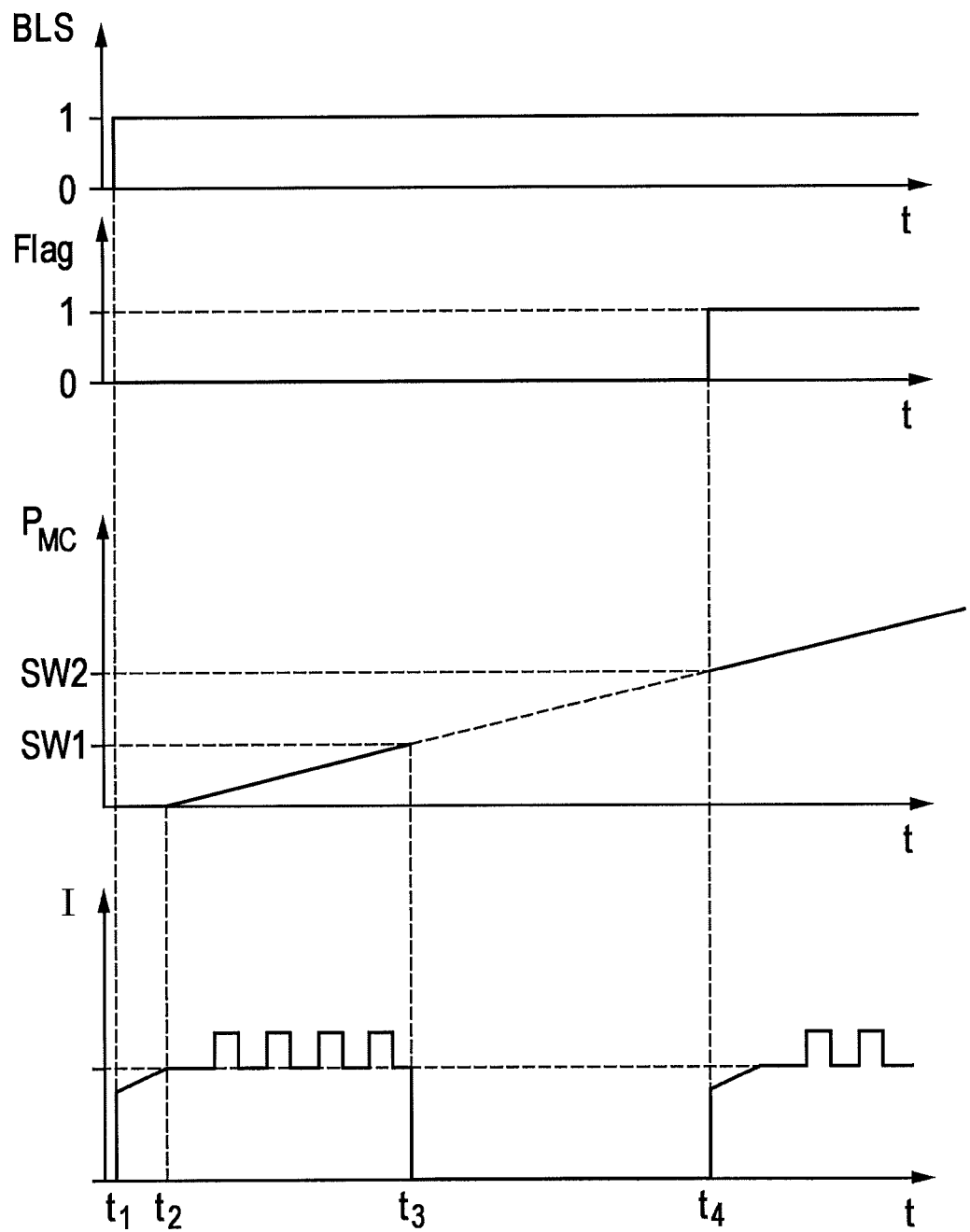
FIG. 5 shows the signal of a brake light switch (BLS).

In step 32, it is now queried whether the flag from step 31 has been set and signal BLS is active. If both conditions are satisfied and brake pressure $p_{mc}$ is simultaneously smaller than a predefined threshold value such as 2 bar, for instance, high-pressure switching valve 7a or 7b is energized in the afore-described manner (step 34), i.e., briefly opened and closed again. Associated current characteristic I is shown in FIG. 5 at the bottom. As soon as admission pressure $p_{mc}$ prevailing at the master brake cylinder exceeds the threshold value of 2 bar, for instance, control current I is switched off and valve 7a, 7b closed as a result. High-pressure instant $t_4$. In step 35, the flag indicating a test run of the pump is reset again.

At instant $t_4$, an automatic brake functionality becomes active, which assists the driver in a braking operation. The associated function flag switches from 0 to 1, as can be gathered from FIG. 5. Immediately thereafter, high-pressure switching valve 7a, 7b is opened in order to attenuate the pressure equalization process. In so doing, the preliminary stage and the main stage of valve 7a, 7b are opened sequentially, in the manner described above.

What is claimed is:

1. A method for automatically braking a motor vehicle using a hydraulic brake system, which includes a multi-stage valve situated between a master brake cylinder, which is coupled to a foot brake, and a hydraulic pump, the method comprising:
    increasing control current for the valve in ramp-shaped manner to initially open a preliminary stage and then a main stage of the valve;
    determining whether the hydraulic pump has been running while the valve was closed at the same time;
    opening the valve as soon as the foot brake is operated; and
    closing the valve again when one of a brake pressure or a quantity proportional to the brake pressure exceeds a predefined threshold value in the course of the braking operation;
    wherein the valve is controllable by the control current.

2. The method as recited in claim 1, wherein the control current is first set to a starting value by stages and then is increased further in ramp-shaped manner until a final value is achieved, at which at least the preliminary stage is open.

3. The method as recited in claim 2, further comprising:
    measuring the brake pressure; and adjusting at least one of the starting value, the final value, and a steepness of the ramp of the control current.

4. The method as recited in claim 1, further comprising:
    determining whether an emergency braking situation is about to occur;
    setting the control current in the ramp-shaped manner if no emergency situation is about to occur; and
    abruptly setting the control current to a value at which the valve opens directly and completely if the emergency situation is about to occur.

5. The method as recited in claim 1, wherein a hydraulic pump is activated to automatically increase the brake pressure acting on a wheel brake when the valve current has reached a final value.

6. The method as recited in claim 1, further comprising:
    determining whether an emergency braking situation is about to occur;
    activating the hydraulic pump when the valve current has reached the final value if no emergency braking situation is about to occur; and
    switching the hydraulic pump on immediately, even before the valve has opened completely, if an emergency braking situation is about to occur.

7. The method as recited in claim 1, wherein the valve is closed again when the brake pressure or the proportional quantity exceeds a threshold value smaller than approximately 5 bar.

8. The method as recited in claim 1, wherein the valve is closed again when the brake pressure or the proportional quantity exceeds a threshold value smaller than approximately 2 bar.

9. A control unit for automatically braking a motor vehicle using a hydraulic brake system which includes a multistage valve situated between a master braking cylinder, which is coupled to a foot brake, and a hydraulic pump, comprising:
    a control arrangement configured to perform the following:
    increasing control current for the valve in ramp-shaped manner to initially open a preliminary stage and then a main stage of the valve;
    determining whether the hydraulic pump has been running while the valve was closed at the same time;
    opening the valve as soon as the foot brake is operated; and
    closing the valve again when one of a brake pressure or a quantity proportional to the brake pressure exceeds a predefined threshold value in the course of the braking operation;
    wherein the valve is controllable by the control current.

10. The control unit as recited in claim 9, wherein the control current is first set to a starting value by stages and then is increased further in ramp-shaped manner until a final value is achieved, at which at least the preliminary stage is open.

11. The control unit as recited in claim 10, wherein the control unit further performs the following: measuring the brake pressure; and adjusting at least one of the starting value, the final value, and a steepness of the ramp of the control current.

12. The control unit as recited in claim 9, wherein the control unit further performs the following:
    determining whether an emergency braking situation is about to occur;

setting the control current in the ramp-shaped manner if no emergency situation is about to occur; and abruptly setting the control current to a value at which the valve opens directly and completely if the emergency situation is about to occur.

13. The control unit as recited in claim 9, wherein a hydraulic pump is activated to automatically increase the brake pressure acting on a wheel brake when the valve current has reached a final value.

14. The control unit as recited in claim 9, wherein the control unit further performs the following:

determining whether an emergency braking situation is about to occur;

activating the hydraulic pump when the valve current has reached the final value if no emergency braking situation is about to occur; and switching the hydraulic pump on immediately, even before the valve has opened completely, if an emergency braking situation is about to occur.

15. The control unit as recited in claim 9, wherein the valve is closed again when the brake pressure or the proportional quantity exceeds a threshold value smaller than approximately 5 bar.

16. The control unit as recited in claim 9, wherein the valve is closed again when the brake pressure or the proportional quantity exceeds a threshold value smaller than approximately 2 bar.

\* \* \* \* \*